United States Patent [19]

Weinberger

[11] Patent Number: 5,402,483
[45] Date of Patent: Mar. 28, 1995

[54] DIGITAL TELEPHONE SYSTEM WITH TERMINALS CONNECTED TO A DIGITAL EXCHANGE UNIT PROVIDING ALL FUNCTIONS OF THE TERMINALS

[75] Inventor: Günter Weinberger, Feldkirchen-Westerham, Germany

[73] Assignee: Siemens Aktiengesellschaft, Munich, Germany

[21] Appl. No.: 748,979

[22] Filed: Aug. 23, 1991

[30] Foreign Application Priority Data

Aug. 23, 1990 [EP] European Pat. Off. ............ 90116185

[51] Int. Cl.[6] .......................................... H04M 11/00
[52] U.S. Cl. ................................ 379/387; 379/386; 379/201; 379/350; 370/29; 370/30
[58] Field of Search ............... 379/350, 204, 201, 386, 379/387; 370/29, 30, 94.1, 110.1

[56] References Cited

U.S. PATENT DOCUMENTS

| 4,741,026 | 4/1988 | Baxter et al. | 379/204 |
| 4,817,147 | 3/1989 | Gorniak et al. | 370/32 X |
| 4,897,866 | 1/1990 | Majmudar et al. | 379/201 |
| 4,907,255 | 3/1990 | Gulick et al. | 370/94.1 |
| 4,961,185 | 10/1990 | Sawada | 370/110.1 |

FOREIGN PATENT DOCUMENTS

| 0173264 | 3/1986 | European Pat. Off. . |
| 0350836 | 1/1990 | European Pat. Off. . |
| 0365200 | 4/1990 | European Pat. Off. . |
| 3721984 | 1/1989 | Germany . |

*Primary Examiner*—James L. Dwyer
*Assistant Examiner*—M. Shehata
*Attorney, Agent, or Firm*—Herbert L. Lerner; Laurence A. Greenberg

[57] ABSTRACT

A telephone apparatus includes a digital exchange unit and at least one digital telephone terminal connected to the digital exchange unit. The at least one digital telephone terminal generates monitoring signals and has multiple functions. All of the monitoring signals generated in the at least one digital telephone terminal are forwarded directly to the digital exchange unit. All of the functions of the at least one digital telephone terminal are controlled directly by the digital exchange unit through corresponding control signals.

4 Claims, 1 Drawing Sheet

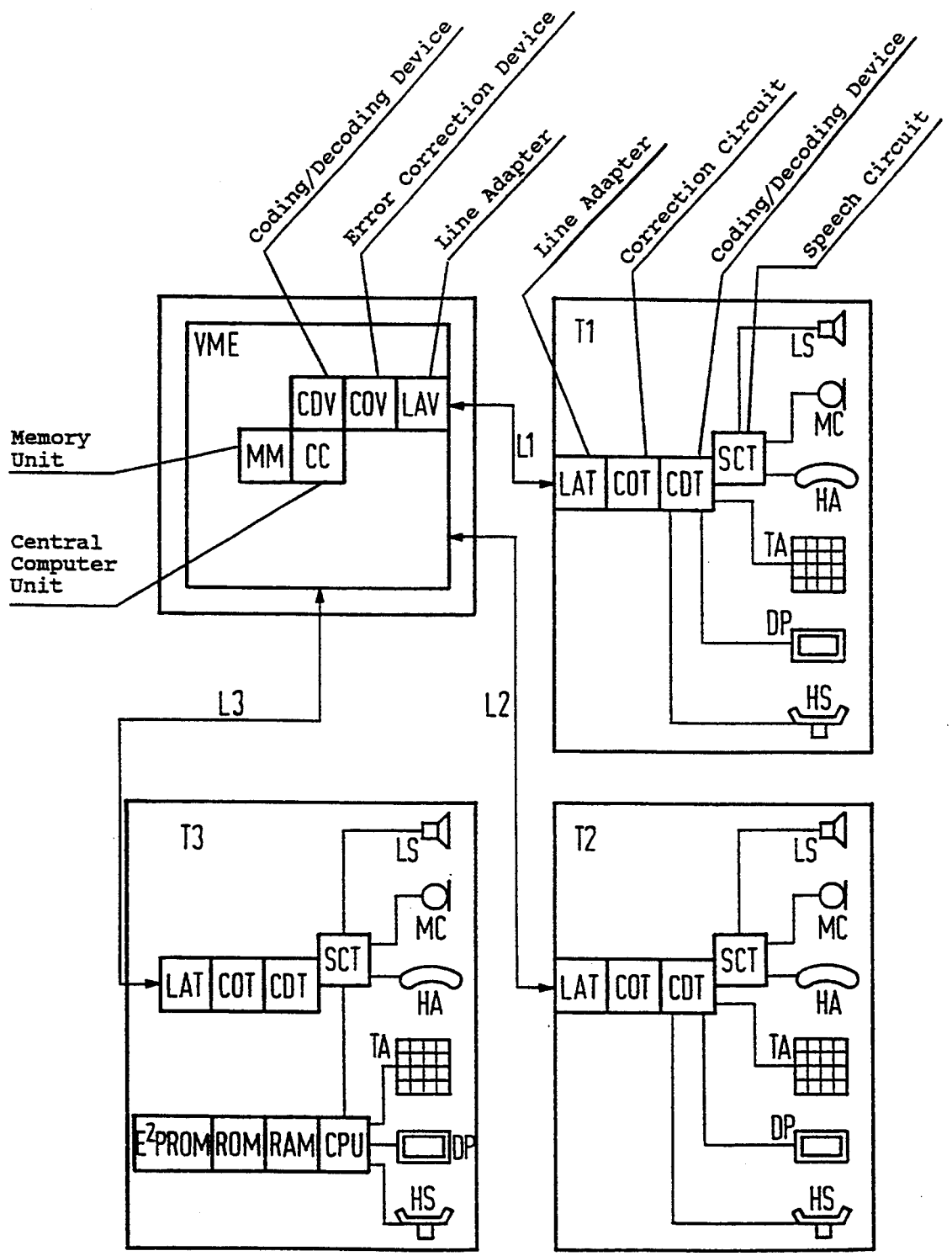

DIGITAL TELEPHONE SYSTEM WITH TERMINALS CONNECTED TO A DIGITAL EXCHANGE UNIT PROVIDING ALL FUNCTIONS OF THE TERMINALS

SPECIFICATION

The invention relates to a telephone apparatus with a digital exchange unit and digital telephone terminals connected to the digital exchange unit.

The ease of use of telephone terminals has increased markedly in recent years. As a result, the number of possible functions, and thus of control functions, that are essentially carried out locally from the telephone terminal, has increased considerably. For keyboard inquiry, display control, wakeup calls, acoustical volume adjustment, monitoring of the feed voltage and of the hybrid circuit contact, storage of numbers in memory and communication with the telephone exchange, in particular for transmission of dialing states, control functions are carried out which usually entail relatively complex procedures. Local control functions in the telephone terminal are therefore predominantly achieved at present with the aid of microcomputers or microprocessors in combination with corresponding volatile and non-volatile memories. To a limited extent, relatively complex logic components (ASICs) are also used. The expense for providing local control functions is accordingly very high.

It is accordingly an object of the invention to provide a digital telephone apparatus, which overcomes the hereinafore-mentioned disadvantages of the heretofore-known devices of this general type and in which the expense for the local control functions is lower.

With the foregoing and other objects in view there is provided, in accordance with the invention, a telephone apparatus, comprising a digital exchange unit, at least one digital telephone terminal connected to the digital exchange unit, the at least one digital telephone terminal generating monitoring signals and having multiple functions, means for forwarding all of the monitoring signals generated in the at least one digital telephone terminal directly to the digital exchange unit, and means for controlling all of the functions of the at least one digital telephone terminal directly by the digital exchange unit through corresponding control signals.

In accordance with another feature of the invention, there are provided means for correcting transmission errors in monitoring and control signals.

In accordance with a concomitant feature of the invention, there are provided means for coding and decoding monitoring and control signals.

Other features which are considered as characteristic for the invention are set forth in the appended claims.

Although the invention is illustrated and described herein as embodied in a digital telephone apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The drawing is a schematic and block circuit diagram of an exemplary embodiment of the invention.

DETAILED DESCRIPTION OF THE INVENTION

Referring now to the single figure of the drawing in detail, there is seen a telephone apparatus according to the invention that includes a digital exchange unit VME, to which digital telephone terminals T1–T3 are connected, for instance, each through one line L1–L3. The digital telephone terminal T1 includes, among other elements, a line adaptor LAT, a correction circuit COT for correcting transmission errors, a coding and decoding device CDT, and a speech circuit SCT. The line adapter LAT is used for adapting the signal level and line termination impedances appearing on the line L1 and in the digital telephone terminal T1. The following error correction device COT ascertains transmission errors and corrects them to the maximum possible extent. Connected to the error correction device COT is the coding and decoding device CDT, which is in turn connected to the speech circuit SCT and to which various peripheral units are connected. Peripheral units of this kind include, for instance, a keyboard TA for inputting the number to be dialed and/or for requesting certain functions; a display DP, for instance, an LCD display; and a hybrid circuit contact or cradle HS. A handset HA, a loudspeaker LS, and a microphone MC are connected to the speech circuit SCT.

In the digital exchange unit VME, a line adaptor LAV, an error correction device COV and a coding and decoding device CDV are associated with the line L1, corresponding to the line adaptor LAT, the error correction device COT and the coding and decoding device CDT in the digital telephone terminal T1. Like the corresponding devices in the digital telephone terminal T1, the devices for the exchange unit are bidirectionally constructed. In other words, they are provided for both transmission and reception operations. Moreover, the digital exchange unit VME includes a central computer unit CC and a memory unit MM. Additionally connected to the digital exchange unit VME are, for instance, the telephone terminal T2, which is identical in structure to the digital telephone terminal T1, and the digital telephone terminal T3, which is of known structure. Each of the telephone terminals is connected through a respective line L2, L3. In the present exemplary embodiment, all of the digital telephone terminals T1–T3 have the same functional capabilities.

The telephone terminal T3 which is constructed in a known manner, like the two digital telephone terminals T1 and T2, includes a line adaptor LAT, an error correction circuit COT, a coding and decoding device CDT and a speech circuit SCT. In addition, however, a local processor unit CPU, a volatile, erasable memory RAM, a non-erasable, non-volatile memory ROM, and an erasable, non-volatile memory $E^2PROM$ are also provided. Connected to the local processor unit CPU are a keyboard TA, a display DP, a hybrid circuit contact or cradle HS, and a speech circuit SCT. Connected to the speech circuit SCT in turn are a handset HA, a microphone MC and a loudspeaker LS.

During operation of the telephone terminal T3 which is constructed in a known manner, all of the functions are controlled by the local processor unit CPU. Communication between the local processor unit CPU and the central computer unit CC of the exchange unit VME takes place only if this is necessary overall for communication between the exchange unit VME and the digital telephone terminal T3, as is the case, for instance, during transmission of the dialing states and of the hybrid circuit contact. In contrast, other functions such as storage of numbers in memory, adjusting the volume, control of the display, and activation of a hands-free talking function, are controlled exclusively by the local processor unit CPU. In contrast, in the telephone terminals T1 and T2, according to the invention, all of the monitoring signals that appear in the various functions are transmitted directly to the digital exchange unit VME. Conversely, all of the functions of these telephone terminals T1 and T2 are controlled directly by the digital exchange unit VME through suitable control signals. The control signals or monitoring signals are encoded like speech signals and are transmitted over the line L1 and L2, respectively. The decisive factor is that the respective telephone terminal, upon some impetus, for instance after a certain key of the keyboard TA is depressed, carries out no other function than precisely the sending of this impetus, as a monitoring signal, to the digital exchange unit VME and evaluates information received from the digital exchange unit VME as a control signal only precisely once. In other words, no subsequent activities are derived from this. The only control functions that remain to the telephone terminal as needed are the activation or deactivation of the applicable line with corresponding line-economizing conditions.

As a result, the complication and expense for circuitry in the telephone terminals are reduced considerably. Above all, economies in terms of local processor units and memory units connected to them can be achieved. In particular, however, it is possible to dispense with an erasable, non-volatile memory that would be required, for instance, for storing numbers in memory. Instead, the control and storage of all functions is carried out by the central computer unit of the digital exchange unit VME. In most cases, the necessary circuitry prerequisites are already met, and therefore no additional expense or effort for circuitry for the digital exchange unit VME is necessary, and changes are necessary only in terms of software. It is also substantially more favorable to provide erasable, non-volatile memories in the digital exchange unit VME by buffering erasable volatile memories, for instance. The expense and complication of the digital telephone terminals decrease considerably.

I claim:

1. A telephone apparatus, comprising a digital exchange unit, at least one digital telephone terminal connected to said digital exchange unit, said at least one digital telephone terminal generating monitoring signals and having multiple functions, means for forwarding all of the monitoring signals generated in said at least one digital telephone terminal directly to said digital exchange unit, and means for controlling all of the functions of said at least one digital telephone terminal directly by said digital exchange unit through corresponding control signals transmitted from said digital exchange unit directly to said at least one digital telephone terminal.

2. The telephone apparatus according to claim 1, including means for correcting transmission errors in monitoring and control signals.

3. The telephone apparatus according to claim 1, including means for coding and decoding monitoring and control signals.

4. The telephone apparatus according to claim 2, including means for coding and decoding monitoring and control signals.

* * * * *